(12) United States Patent
Masuda et al.

(10) Patent No.: US 8,020,249 B2
(45) Date of Patent: Sep. 20, 2011

(54) WIPER APPARATUS

(75) Inventors: Tadashi Masuda, Wako (JP); Mamoru Kagawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 464 days.

(21) Appl. No.: 12/207,812

(22) Filed: Sep. 10, 2008

(65) Prior Publication Data

US 2009/0064442 A1    Mar. 12, 2009

(30) Foreign Application Priority Data

Sep. 11, 2007 (JP) .................................. 2007-235609

(51) Int. Cl.
*B60S 1/34* (2006.01)
(52) U.S. Cl. .................................. 15/250.351
(58) Field of Classification Search .............. 15/250.32, 15/250.351, 250.43, 250.44, 250.361
See application file for complete search history.

(56) References Cited

U.S. PATENT DOCUMENTS

2005/0005387 A1 * 1/2005 Kinoshita et al. .......... 15/250.32

FOREIGN PATENT DOCUMENTS

| EP | 1 559 623 | 8/2005 |
|----|-----------|--------|
| JP | 2000-344057 | 12/2000 |
| JP | 2008-213552 | 9/2008 |
| JP | 2008-230471 | 10/2008 |

* cited by examiner

*Primary Examiner* — Gary Graham
(74) *Attorney, Agent, or Firm* — Rankin, Hill & Clark LLP

(57) ABSTRACT

A wiper apparatus includes an arm shank pivotably supported at its proximal end portion on a vehicle and an arm piece mounted at its proximal end portion to a distal end portion of the arm shank and having a wiper blade attached to the other end portion remote from the distal end portion of the arm shank. The wiper apparatus also includes an arm piece cover covering the arm piece having an outer peripheral surface flush with an outer peripheral surface of the distal end portion of the arm shank.

10 Claims, 8 Drawing Sheets

WIPER APPARATUS

FIELD OF THE INVENTION

The present invention relates to a wiper apparatus for wiping a vehicular window glass with a wiper blade.

BACKGROUND OF THE INVENTION

In wiper apparatus for vehicles, an arm shank is pivotably supported at its proximal end portion on a vehicle body, an arm piece is mounted to a distal end portion of the arm shank, and a wiper blade is mounted to the arm piece. Window glass is wiped with the wiper blade through pivoting movement of the ark shank.

Generally, such wiper apparatus are mounted on a vehicle body with the arm piece swaged to a distal end portion of the arm shank. Therefore, a step or level difference would be formed between the distal end portion of the arm shank and the arm piece, which impairs the outer appearance of the wiper apparatus.

To eliminate such an undesired level difference between the distal end portion of the arm shank and the arm piece, it has been proposed to form a sectional shape of the arm piece such that a portion of the arm shank to be swaged to the distal end portion of the arm shank has a relatively small size and another portion of the arm shank projecting from the distal end portion of the arm shank has a greater size (see, for example, the wiper apparatus disclosed in Japanese Patent Application Laid-Open Publication No. 2000-344057). By thus appropriately changing the sectional shape of the arm piece, it is possible to minimize or eliminate the level difference between the distal end portion of the arm shank and the arm piece; in this way, the outer peripheral surface of the arm piece can be made flush with the outer peripheral surface of the arm shank.

However, with the wiper apparatus disclosed in the 2000-344057 publication, which requires a particular sectional shape of the arm piece, it is difficult to appropriately shape the arm piece. Thus, formation of the arm piece tends to be complicated. Therefore, it has also been proposed to form the arm piece of resin so that it can be readily molded into the particular sectional shape. If the arm piece is formed of resin like this, however, a sufficient rigidity of the arm piece can not be secured, and as a consequence, the arm piece can not appropriately press the wiper blade against a window glass. Therefore, the window glass can not be appropriately wiped with the wiper blade of the wiper apparatus.

SUMMARY OF THE INVENTION

In view of the foregoing prior art problems, it is an object of the present invention to provide an improved wiper apparatus which can not only eliminate an undesired level difference between a distal end portion of an arm shank and an arm piece but also secure a sufficient rigidity of the arm piece.

In order to accomplish the above-mentioned object, the present invention provides an improved wiper apparatus provided near a vehicle for wiping a window glass of the vehicle by means of a wiper blade, which comprises: an arm shank pivotably supported at a proximal end portion thereof by the vehicle; an arm piece mounted at one end portion to a distal end portion of the arm shank and having the wiper blade attached to another end portion thereof remote from the distal end portion of the arm shank; and an arm piece cover covering the arm piece and having an outer peripheral surface generally flush with an outer peripheral surface of the distal end portion of the arm shank.

In the wiper apparatus of the present invention, where the outer peripheral surface of the arm piece cover is flush with the outer peripheral surface of the distal end portion of the arm shank, no step or level difference is formed between the distal end portion of the arm piece cover and the arm shank, and thus, it is possible to provide a sense of unity or oneness between the arm piece cover and the arm shank and thereby significantly enhance the outer appearance of the wiper apparatus. Further, because the arm piece and the arm piece cover are formed as separate component parts, the arm piece can be significantly simplified in shape and thus can be readily formed of a material having a greater rigidity. With the arm piece formed of a high-rigidity material, it is possible to secure a sufficient rigidity of the arm piece and appropriately press the wiper blade against the window glass by means of the arm piece. In this way, the window glass can be appropriately wiped with the wiper blade.

In an embodiment, the arm piece cover has a cover body that covers a surface of the arm piece opposite from the window glass, and a side wall that extends from one of opposite side edges of the cover body to cover a side surface of the arm piece. In assembly of the wiper apparatus, the side wall of the arm piece cover is caused to abut against the side surface of the arm piece so that the cover can be positioned in a predetermined mounting position using the side wall. Thus, the arm piece cover can be readily positioned in the predetermined mounting position and attached to the arm piece with an increased ease. Further, by causing the side wall to abut against the side surface of the arm piece, the arm piece cover can be attached to the arm piece with an increased accuracy and increased stability.

In an embodiment, the side wall of the arm piece cover covers a front side surface, facing forward as viewed in a front-rear direction of the vehicle, of the arm piece. Thus, an air stream produced during travel of the vehicle ("traveling air stream") can be received by the side wall, so that the arm piece cover can be reliably kept attached to the arm piece with an increased stability during travel of the vehicle.

In an embodiment, the arm piece cover has a projecting wall section that projects from the side wall of the arm piece cover along a surface of the arm piece facing the window glass. Thus, in assembly of the wiper apparatus, the arm piece cover can be attached to the arm piece with the arm piece sandwiched between the projecting wall section and the arm piece cover.

In an embodiment, one end portion of the arm piece cover is held in end-to-end abutment against the distal end portion of the arm shank in an abutment region between the arm piece cover and the arm shank. The projecting wall section of the arm piece cover has, in a portion thereof adjacent to the distal end portion of the arm shank, a positioning portion and an expansion/contraction permitting portion located remoter than the positioning portion from the abutment region. The expansion/contraction permitting portion has an expansion/contraction margin for permitting thermal expansion/contraction of the arm piece cover in a longitudinal direction of the arm piece cover. The positioning portion permits accurate positioning of the arm piece cover, and the expansion/contraction permitting portion permits thermal expansion/contraction of the arm piece cover in the longitudinal direction.

In an embodiment, the arm piece is formed of a material of greater rigidity than the arm piece cover covering the arm piece. Thus, it is possible to effectively prevent the arm piece cover from undesirably swaying relative to the arm shank.

Thus, it is possible to attach the arm piece cover to the arm shank with an increased sense of unity or oneness.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Figure 1:
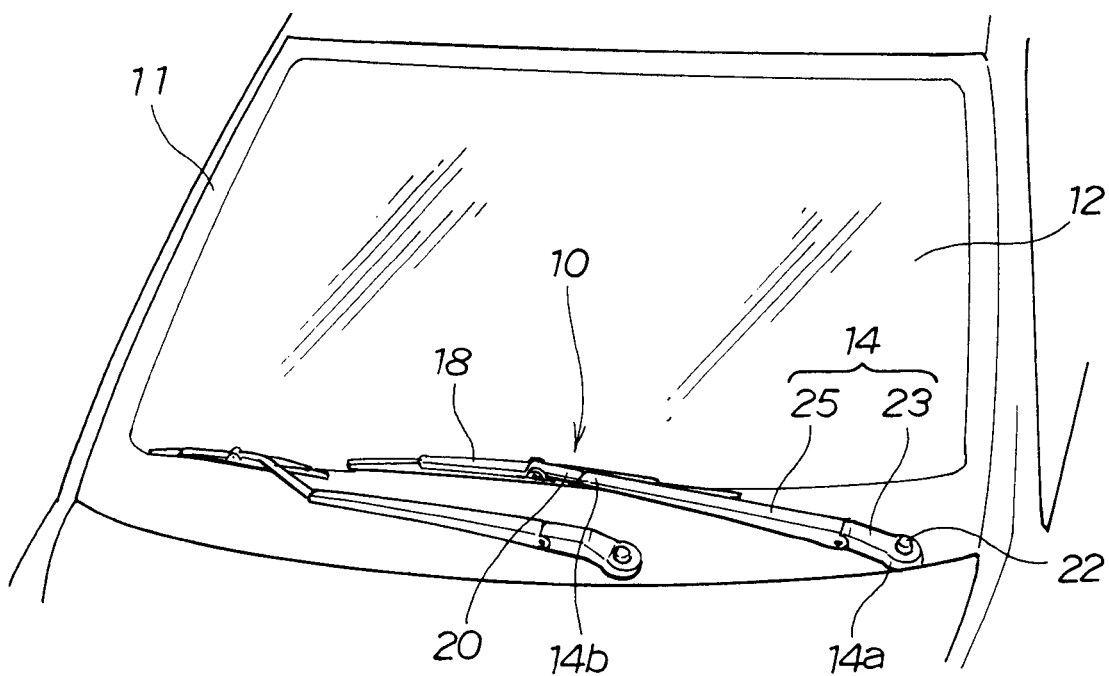
FIG. 1 is a perspective view showing a vehicle provided with a wiper apparatus according to an embodiment of the present invention.
Figure 2:
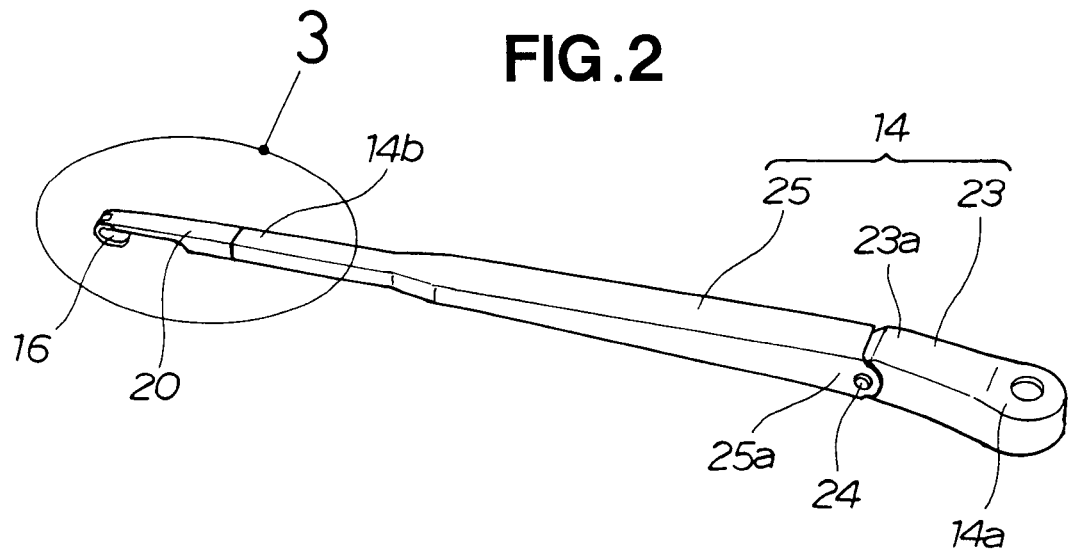
FIG. 2 is a perspective view showing the wiper apparatus with a wiper blade removed therefrom.

Reference is now made to FIG. 1 showing in perspective a vehicle provided with a wiper apparatus according to an embodiment of the present invention, and to FIG. 2 showing in perspective the wiper apparatus with a wiper blade removed therefrom. The wiper apparatus 10 is provided near a front window glass 12 of the vehicle 11 to wipe the window glass 12.

The wiper apparatus 10 includes an arm shank 14 pivotably supported at its proximal end portion 14a by the vehicle 11, an arm piece 16 mounted to a distal end portion 14b of the arm shank 14, a wiper blade 18 attached to the arm piece 16, and an arm piece cover 20 covering the arm piece 16.

The arm shank 14 includes a head 23 having the proximal end portion 14a pivotably supported on the vehicle 11 by means of a bolt 22, and a retainer 25 connected to a distal end portion 23a of the head 23 by means of a connection pin 24. The head 23 is pivotable about the bolt 22 along the front window glass 12. The retainer 25 is connected at its proximal end portion 25a to the head 23 by means of the connection pin 24 in such a manner that it is pivotable generally vertically in a direction perpendicular to the front window glass 12.

Tension spring (not shown) extends between and is fixed at its opposite ends to the head 23 and the retainer 25, and the retainer 25 is normally urged by the not-shown tension spring toward the front window glass 12. Thus, through pivoting movement of the arm shank 14, the wiper blade 18 can be moved along the front window glass 12 to wipe the window glass 12.

Figure 3:
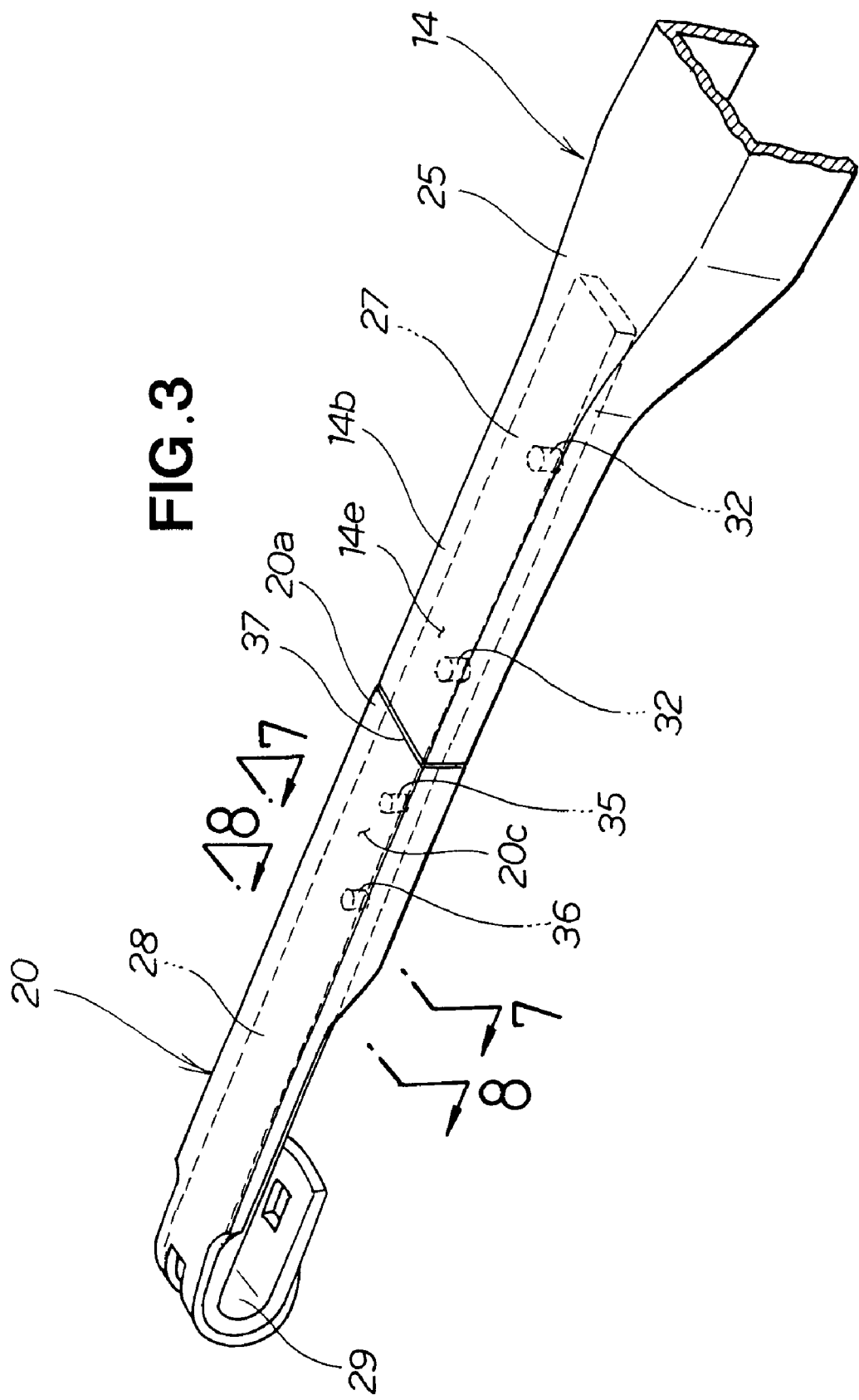
FIG. 3 is an enlarged view of section "3" depicted in FIG. 2.
Figure 4:
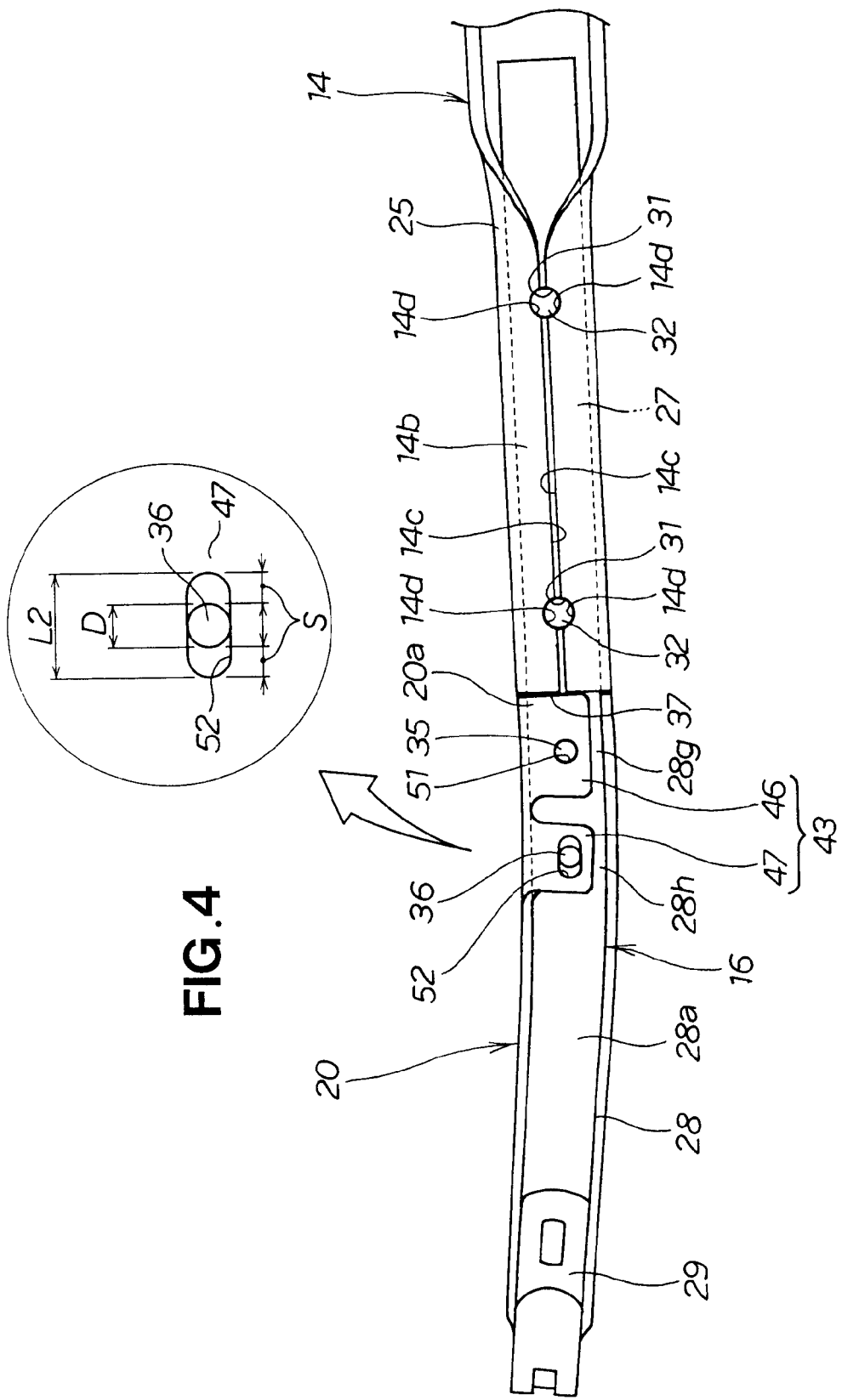
FIG. 4 is a plan view showing the wiper apparatus of the invention as viewed from a front window glass.
Figure 5:
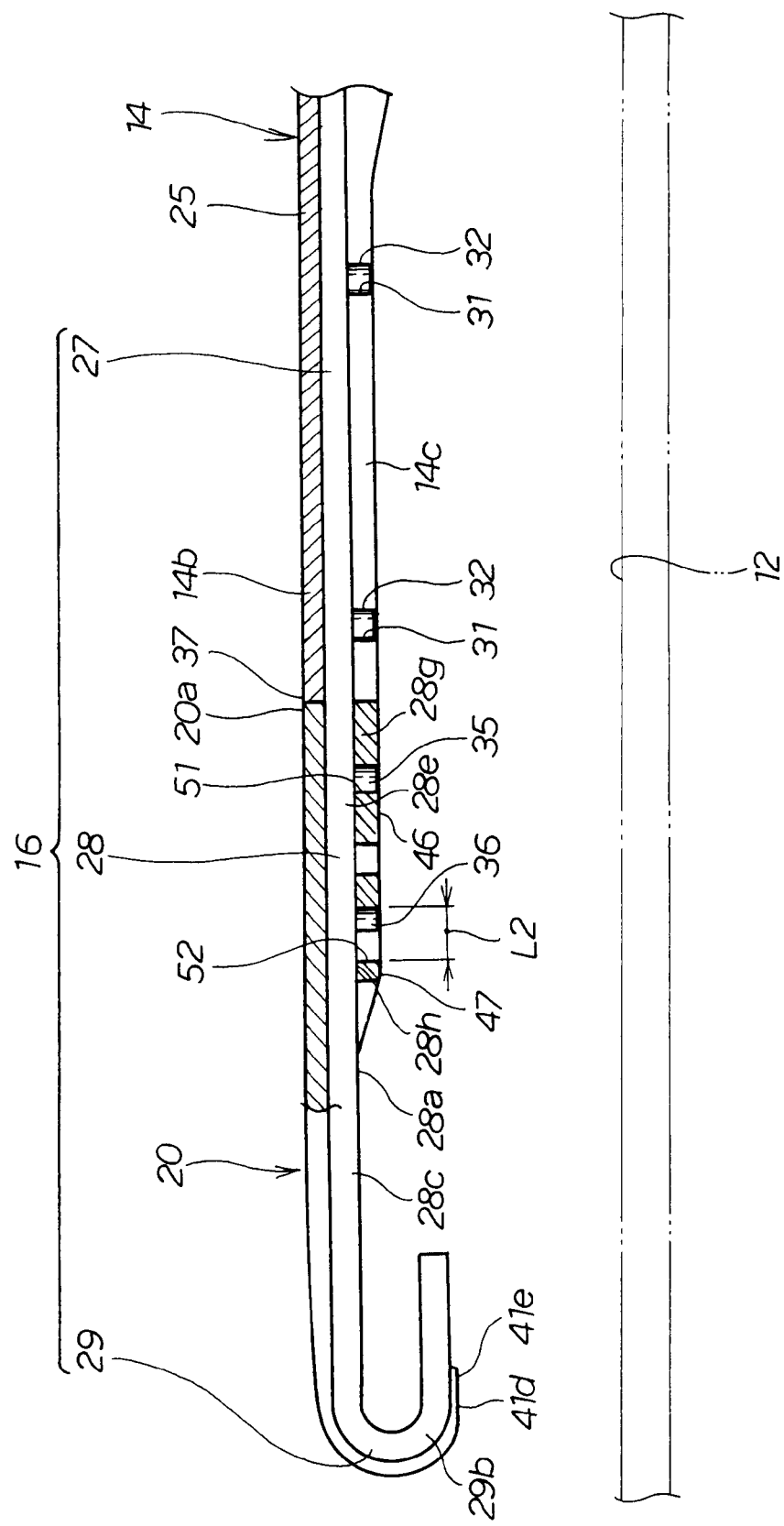
FIG. 5 is a sectional view of the wiper apparatus of the invention.

FIG. 3 is an enlarged view of section "3" depicted in FIG. 2, FIG. 4 is a plan view showing the wiper apparatus 10 as viewed from the front window glass 12, and FIG. 5 is a sectional view of the wiper apparatus 10.

Fixation portion (one end portion) 27 of the arm piece 16 is mounted to the distal end portion of the arm shank 14 (i.e., distal end portion of the retainer 25). More specifically, the distal end portion 14b of the arm shank 14 is squeezed or pressed so that the fixation portion 27 of the arm piece 16 is tightly wrapped in the distal end portion 14b; namely, the fixation portion 27 of the arm piece 16 is swaged into the distal end portion 14b of the arm shank 14.

A pair of opposed recesses 14d are formed in opposed longitudinal side edges 14c of the distal end portion 14b of the arm shank 14. The opposed recesses 14d together constitute a fitting hole 31 with the distal end portion 14b of the arm shank 14 (retainer 25) squeezed or pressed in the afore-mentioned manner. Locking pin 32 is fitted in the fitting hole 31 so that the fixation portion 27 of the arm piece 16 is retained by the distal end portion 14b of the arm shank 14 even more firmly by means of the locking pin 32.

Figure 7:
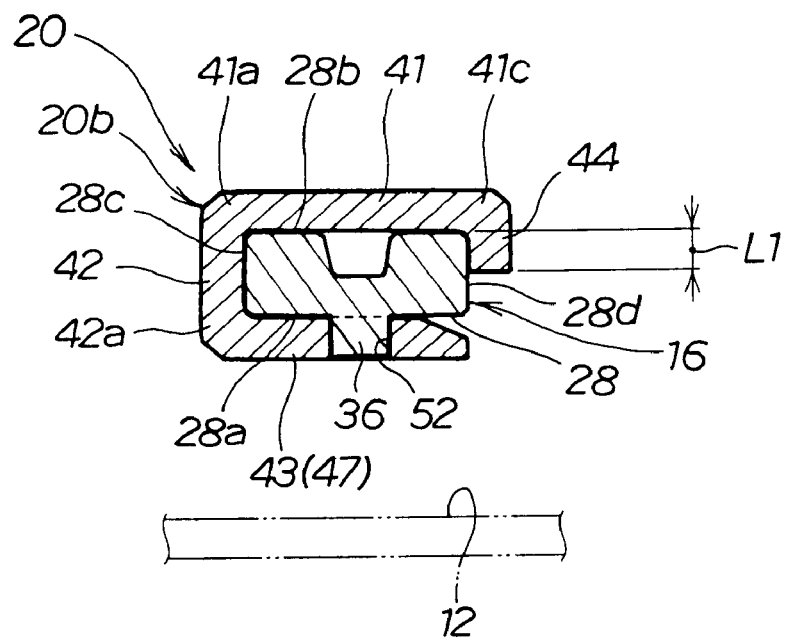
FIG. 7 is a sectional view taken along line 7-7 of FIG. 3.

The arm piece 16 is formed of steel having a greater rigidity than the arm piece cover 20 and has a substantially rectangular sectional shape as shown in FIG. 7. Thus, the distal end portion 14b of the retainer 25, having the fixation portion 27 of the arm piece 16 tightly wrapped therein, also has a substantially rectangular sectional shape.

As shown in FIG. 5, the arm piece 16 has a piece body 28 projecting straight, along the front window glass 12, beyond the distal end of the retainer 25 toward the distal end of the arm piece 16, and a bent portion 29 bent toward the front window glass 12. Namely, the arm piece 16 has the fixation portion 27, piece body 28 and bent portion 29, and the piece body 28 and bent portion 29 together define a generally J shape.

First and second locking pins 35 and 36 project from an underside surface 28a (i.e., surface facing the front window glass 12) of the piece body 28, details of which will be discussed later.

The wiper blade 18 (see FIG. 1) is attached to the bent portion 29 of the piece body 28, as in the conventionally-known wiper apparatus. The arm piece cover 20 is attached to the arm piece 16.

The arm piece cover 20 has a proximal end portion 20a held in end-to-end abutment against the distal end portion 14b of the retainer 25 to thereby define an abutment region 37. In this condition, the arm piece 20 is covered with the arm piece cover 20.

Figure 6:
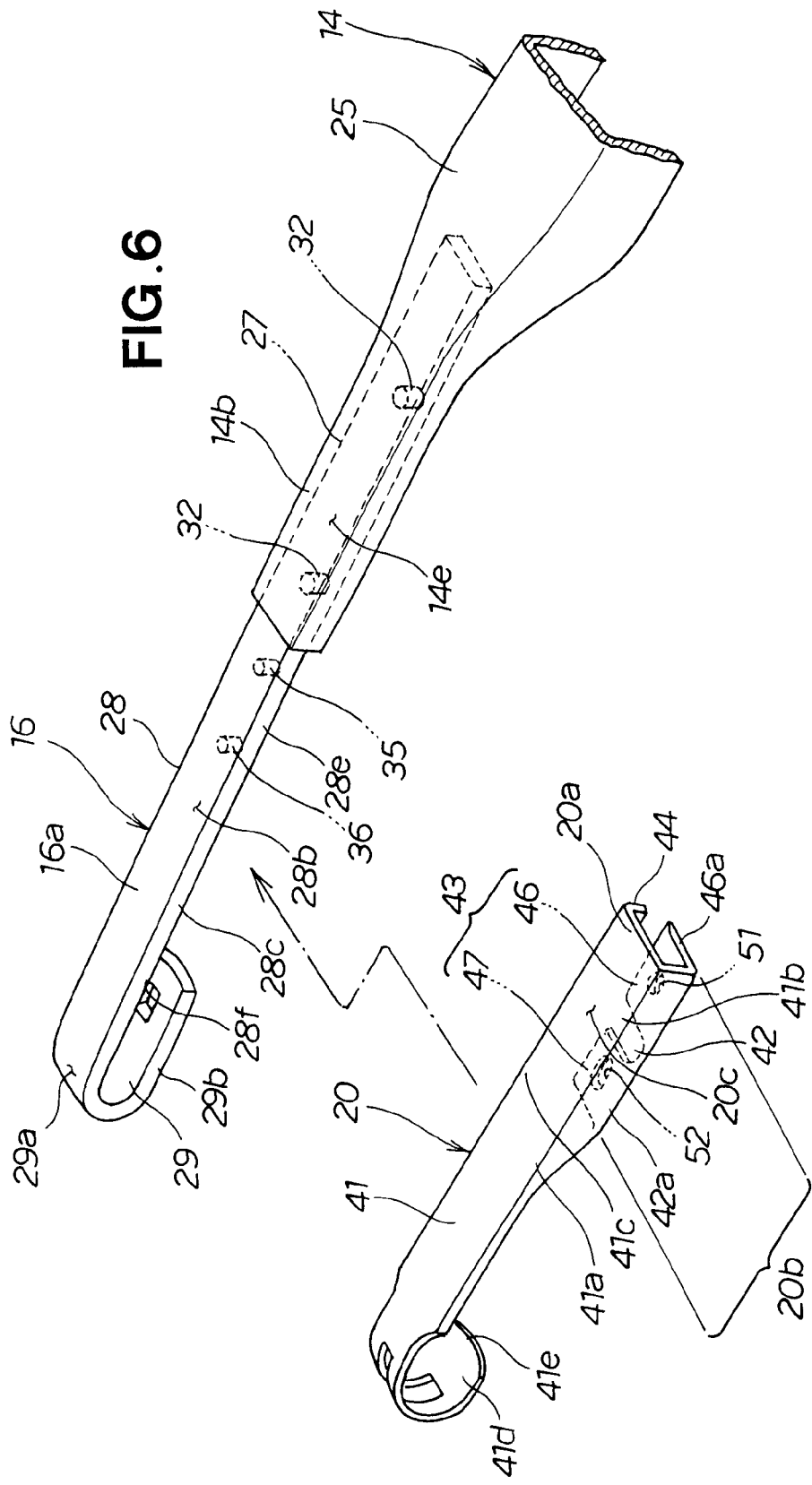
FIG. 6 is an exploded perspective view showing the wiper apparatus of the invention.
Figure 8:
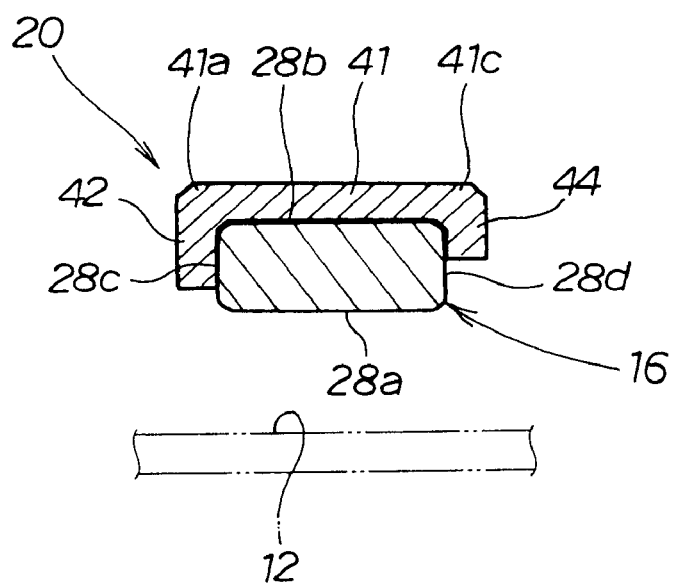
FIG. 8 is a sectional view taken along line 8-8 of FIG. 3.

FIG. 6 is an exploded perspective view showing the wiper apparatus 10, FIG. 7 is a sectional view taken along the 7-7 line of FIG. 3, and FIG. 8 is a sectional view taken along the 8-8 line of FIG. 3.

The arm piece cover 20 is a resin-made cover which includes: a cover body 41 covering an outer surface 16a of the arm piece 16; a front side wall 42 facing forward as viewed in a front-rear direction of the vehicle and extending from a substantial half region 41b of a front side edge 41a of the cover body 41; a projecting wall section 43 extending rearward (toward the front window glass 12) from the lower end edge of the front side wall 42; and a rear side wall 44 extending from a rear side edge 41c of the cover body 41. Because the arm piece cover 20 is formed of resin and elastically deformable, it can be readily attached to the arm piece 16.

In the arm piece cover 20, the rear side wall 44 has a small downward projecting dimension L1, and thus, the cover body 41, front side edge 41a and projecting wall section 43 together define a laterally-facing U sectional shape (see FIG.

7). Of the arm piece cover 20, a locking section 20b of a laterally-facing U sectional shape has an outer peripheral surface 20c substantially flush with an outer peripheral surface 14e of the distal end portion 14b of the retainer 25 (see also FIG. 3). In this way, no step or level difference is formed between the distal end portion 14b of the retainer 25 and the arm piece 16, and thus, it is possible to enhance the outer appearance of the wiper apparatus.

The cover body 41 extends straight along the outer surface (i.e., surface opposite or remote from the front window glass 12) of the piece body 28 and bends in a substantial laterally-facing U shape along an outer or upperside surface 29a of the bent portion 29 (see FIG. 6). Namely, the outer surface 16a (i.e., upperside surfaces 28b and 29a) of the arm piece cover 20 is covered with the cover body 41.

The cover body 41 has a distal end portion 41d of a thickness gradually decreasing toward a distal end edge 41e thereof. The front side wall 42 extends downward from the substantial half region 41b, closer to the retainer 25, of the front side edge 41a of the cover body 41.

Thus, a front side surface 28c of the piece body 28 is covered with the front side wall 42 of the arm piece cover 20. More specifically, a substantial half region 28e, closer to the retainer 25, of the front side surface 28c of the piece body 28 is covered with the front side wall 42 of the arm piece cover 20. In this way, an air stream produced during travel of the vehicle (hereinafter referred to as "traveling air stream") can be received by the front side wall 42.

Further, a remaining region 28f of the front side surface 28c of the piece body 28 and a front side surface 29b of the bent portion 29 are not covered with the front side wall 42 of the arm piece cover 20. Therefore, when operation for mounting the arm piece 16 to the wiper blade 18 is to be performed, the front side wall 42 does not undesirably hinder the mounting operation.

The projecting wall section 43, which extends rearward from the front side wall 42, includes first and second projecting wall portions 46 and 47 extending from the lower end edge 42a of the front side wall 42 in opposed relation to the cover body 41 and along the underside surface 28a facing the piece body 28.

Referring back to FIGS. 4 and 5, the first projecting wall portion 46 extends along a region 28g, closer to the retainer 25, of the underside surface 28a of the piece body 28, and it is held in abutment against the distal end of the retainer 25. The second projecting wall portion 47 extends along a region 28h, remote from the retainer 25, of the underside surface 28a.

With the first and second projecting wall portions 46 and 47 extending rearward along the underside surface 28a of the piece body 28, the piece body 28 can be sandwiched between the first and second projecting wall portions 46 and 47 and the cover body 41. In this way, the arm piece cover 20 can be attached to the arm piece 16.

The first projecting wall portion 46 has a positioning hole 51 formed therein as a positioning means near the distal end of the retainer 25, and the above-mentioned first locking pin 35 is inserted in the positioning The second projecting wall portion 47 has an expansion/contraction permitting elongated hole 52 formed therein as an expansion/contraction permitting means and located remoter than the positioning hole 51 from the abutment region 37, and the above-mentioned second locking pin 36 is inserted in the expansion/contraction permitting elongated hole 52.

The expansion/contraction permitting elongated hole 52 is elongated, or has a long axis, in the longitudinal direction of the arm piece cover 20. The long axis of the expansion/contraction permitting elongated hole 52 has a length L2 greater than a diameter D of the second locking pin 36. Thus, the expansion/contraction permitting elongated hole 52 as an expansion/contraction permitting means has an expansion/contraction margin S(L2−D) for permitting thermal expansion/contraction, in the longitudinal direction, of the arm piece cover 20.

Thus, as the arm piece cover 20 thermally expands in the longitudinal direction, for example, the expansion/contraction permitting elongated hole 52 can move relative to the arm piece cover 20 in the longitudinal direction of the cover 20 within the range of the expansion/contraction margin S. With such movement of the expansion/contraction permitting elongated hole 52 in the longitudinal direction of the arm piece cover 20, the positioning hole 51 can be held positionally stationary or fixed via the first locking pin 35.

Thus, as the arm piece cover 20 thermally expands or contracts, the expansion/extraction of the arm piece cover 20 is permitted by the expansion/contraction permitting hole 52 with the proximal end portion 20a of the arm piece cover 20 held in end-to-end abutment against the distal end portion 14b of the retainer 25 by means of the positioning hole 51. In this way, it is possible to secure a good outer appearance of the wiper apparatus 10.

Because the arm piece 16 and the arm piece cover 20 are formed as separate component parts as noted above, the arm piece 16 can be significantly simplified in shape. Thus, it is possible to easily form the arm piece 16 of a material having a greater rigidity than the arm piece cover 20.

With the arm piece 16 formed of a high-rigidity material, such as steel, it is possible to secure a sufficient rigidity of the arm piece 16 and appropriately press the wiper blade 18 against the front window glass 12 by means of the arm piece 16 as shown in FIG. 1. In this way, the front window glass 12 can be appropriately wiped with the wiper blade 18.

In addition, with the arm piece 16 and arm piece cover 20 formed as separate component parts, it is possible to obtain a sense of unity or oneness between the arm piece 16 and the arm shank 14 by means of the arm piece cover 20 while securing a sufficient rigidity of the arm piece 16.

More specifically, by attaching the arm piece cover 20 to the arm piece 16 formed of a high-rigidity material, such as steel, it is possible to prevent the arm piece cover 20 from undesirably swaying relative to the arm shank 14 (retainer 25). Thus, it is possible to attach the arm piece cover 20 to the arm shank 14 (retainer 25) with an increased sense of unity or oneness.

Figure 9A:
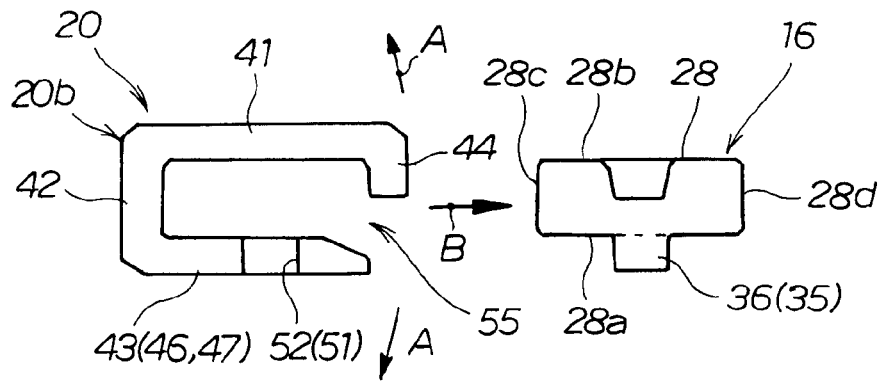
FIGS. 9A-9C are views illustrating an operational sequence for attaching an arm piece cover to an arm piece of the wiper apparatus of the invention.
Figure 9B:
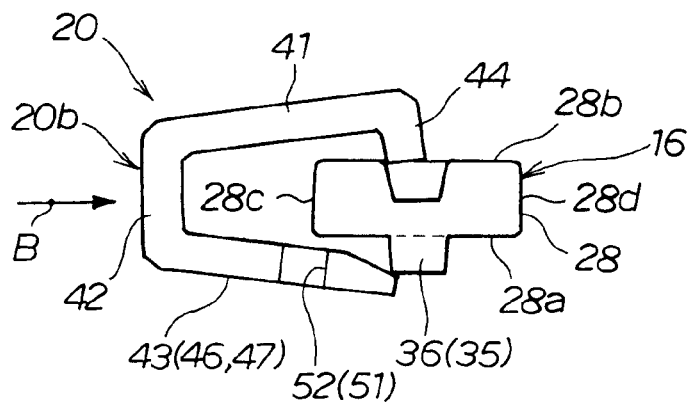

The following lines describe an example manner in which the arm piece cover 20 of the wiper apparatus 10 is attached to the arm piece 16. FIGS. 9A-9B are views explanatory of an operational sequence for attaching the arm piece cover 20 to the arm piece 16.

First, the locking section 20b of the arm piece cover 20 is positioned in front of a front side portion of the piece body 28 in such a manner that a rear opening 55 of the locking section 20b is opposed to the front side portion of the piece body 28, as shown in FIG. 9A.

Next, the locking section 20b is elastically deformed to move the rear side wall 44 and the projecting section 43 (first and second projecting wall portions 46 and 47) away from each other as indicated by arrow A. Then, the arm piece cover 20 is moved toward the arm piece 16, as indicated by arrow B.

Then, as indicated in FIG. 9B, the rear side wall 44 of the locking section 20b is placed on the upperside surface 28b of the piece body 28, and the projecting wall section 43 (first and second projecting wall portions 46 and 47) of the locking section 20b is placed on the underside surface 28a of the piece body 28.

In the aforementioned condition, the arm piece cover 20 is further moved as indicated by arrow B, so that the first projecting wall portion 46 runs onto the first locking pin 35 while the second projecting wall portion 47 runs onto the second locking pin 36.

Figure 9C:
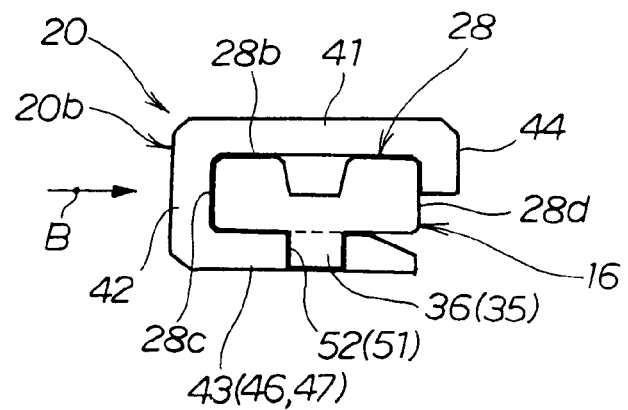

Then, as shown in FIG. 9C, the arm piece cover 20 is further moved, as indicated by arrow B, until the front side wall 42 abuts against the front side surface 28c of the piece body 28. In this way, the arm piece cover 20 can be positioned in a predetermined mounting position. With the arm piece cover 20 thus positioned in the predetermined mounting position, the rear wall 44 gets over the upperside surface 28b, and the positioning hole 51 and expansion/contraction permitting hole 52 are fitted around the first and second locking pins 35 and 36, respectively.

Also, the locking section 20b recovers from the elastic deformation so that the rear wall 44 abuts against a rear side surface 28d and the positioning hole 51 and expansion/contraction permitting hole 52 are engaged with the first and second locking pins 35 and 36, respectively. In this way, the arm piece cover 20 can be attached to the arm piece 16.

By positioning the arm piece cover 20 in the predetermined mounting position using the front side wall 42 as noted above, the arm piece cover 20 can be attached to the arm piece 16 with an increased ease. Further, by causing the front side wall 42 to abut against the front side surface 28c of the piece body 28 as noted above, the arm piece cover 20 can be attached to the arm piece 16 with an increased accuracy and increased stability.

Figure 10A:
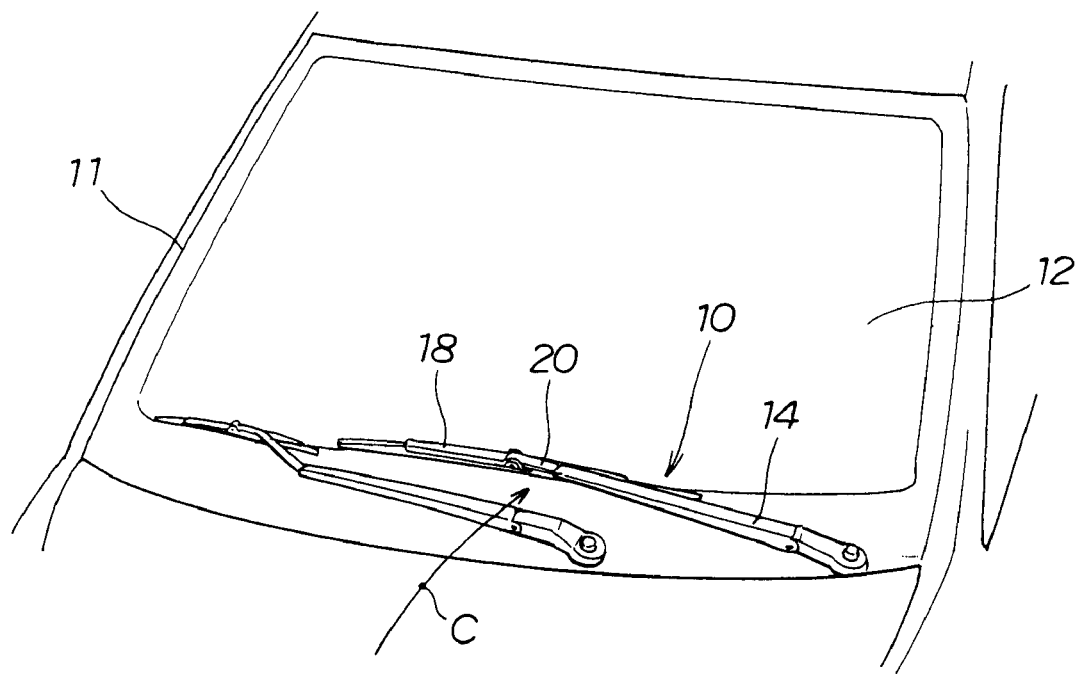
FIGS. 10A and 10B are views illustrating how a traveling air stream acts on the wiper apparatus of the invention.
Figure 10B:
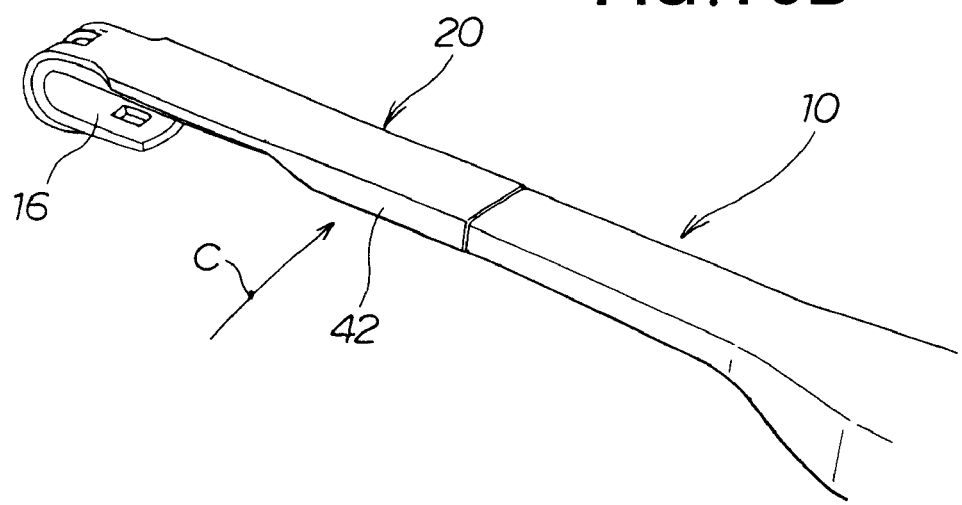

Next, a description will be given about behavior of the wiper apparatus 10. FIGS. 10A and 10B are views explanatory of how a traveling air stream acts on the wiper apparatus 10.

As indicated by arrow C in FIG. 10A, an air stream flows as the vehicle 11 travels, and the traveling air stream acts on the wiper apparatus 10.

In the wiper apparatus 10, as shown in FIG. 10B, the substantial half region 28e, closer to the retainer 25, of the front side surface 28c of the piece body 28 is covered with the front side wall 42. Thus, the traveling air stream can be received by the front side wall 42, as indicated by arrow C. In this way, the arm piece cover 20 can be kept fixedly attached to the arm piece 16 with an enhanced stability and reliability during the travel of the vehicle 11.

Further, of the front side surface of the arm piece 16, the surface portion not covered with the front side wall 42 of the arm piece cover 20 is covered with a mounting portion of the wiper blade 18. Thus, the mounting portion of the wiper blade 18 can prevent the traveling air stream from directly acting on the surface portion of the arm piece 16 not covered with the front side wall 42 of the cover 20. Therefore, there is no possibility of the surface portion not covered with the front side wall 42 loosing stability due to the influence of the traveling air stream.

Whereas the preferred embodiment of the wiper apparatus 10 has been described above in relation to the case where the front side surface 28c is covered with the front side wall 42 of the arm piece cover 20, the present invention is not so limited, and the rear side surface 28d may be covered with the rear side wall 28d of the piece body 28.

Further, whereas the preferred embodiment of the wiper apparatus 10 has been described above in relation to the case where the positioning hole 51 and expansion/contraction permitting elongated hole 52 are provided as the positioning means and expansion/contraction permitting means, the present invention is not so limited, and the positioning means and expansion/contraction permitting means may be a positioning projection and expansion/contraction permitting projection. In such a case, a first locking hole for fitting engagement with the positioning projection is formed in the underside surface 28a of the piece body 28, and a second, elongated locking hole is formed for fitting engagement with the expansion/contraction permitting projection.

The present invention is well suited for use in automotive vehicles provided with a wiper apparatus for wiping a window glass of the vehicle with a wiper blade.

Obviously, various minor changes and modifications of the present invention are possible in light of the above teaching. It is therefore to be understood that within the scope of the appended claims the invention may be practiced otherwise than as specifically described.

What is claimed is:

1. A wiper apparatus for wiping a window glass of a vehicle by means of a wiper blade, said wiper apparatus comprising:
an arm shank pivotably supported at a proximal end portion thereof on the vehicle;
an arm piece mounted at one end portion thereof to a distal end portion of said arm shank and having the wiper blade attached to another end portion thereof remote from the distal end portion of said arm shank; and
an arm piece cover covering said arm piece and having an outer peripheral surface generally flush with an outer peripheral surface of the distal end portion of said arm shank, the arm piece cover comprising a cover body that covers a surface of the arm piece opposite from the window glass, a side wall that extends from one of opposite side edges of the cover body to cover a side surface of the arm piece, and a projecting wall section that projects from the side wall of the arm piece cover and covers a surface of the arm piece facing the window glass,
wherein the projecting wall section has a positioning hole and the arm piece has a locking pin at a surface of the arm piece facing the window glass, the locking pin engaging the positioning hole.

2. The wiper apparatus according to claim 1, wherein the side wall of said arm piece cover covers a front side surface, facing forward as viewed in a front-rear direction of the vehicle, of said arm piece.

3. The wiper apparatus according to claim 1, wherein said arm piece is formed of a material of greater rigidity than said arm piece cover.

4. The wiper apparatus according to claim 1, wherein the cover body and the projecting wall section sandwich the arm piece.

5. The wiper apparatus according to claim 1, wherein the projecting wall section projects from a lower end edge of the side wall of the arm piece cover.

6. The wiper apparatus according to claim 1, wherein the cover body, the side wall, and the projecting wall section define a laterally-facing U cross sectional shape.

7. The wiper apparatus according to claim 1, wherein the arm piece cover covers the arm piece by sandwiching the arm piece with the cover body and the projecting wall section.

8. A wiper apparatus for wiping a window glass of a vehicle by means of a wiper blade, said wiper apparatus comprising:
an arm shank pivotably supported at a proximal end portion thereof on the vehicle;
an arm piece mounted at one end portion thereof to a distal end portion of said arm shank and having the wiper blade attached to another end portion thereof remote from the distal end portion of said arm shank; and an arm piece cover covering said arm piece and having an outer peripheral surface generally flush with an outer peripheral surface of the distal end portion of said arm shank, wherein said arm piece cover has a cover body that covers a surface of said arm piece opposite from the window glass, and a side wall that extends from one of opposite side edges of the cover body to cover a side surface of said arm piece, wherein said arm piece cover has a projecting wall section that projects from the side wall of said arm piece cover along a surface of said arm piece facing the window glass, wherein one end portion of said arm piece cover is held in end-to-end abutment against the distal end portion of the arm shank in an abutment region between said arm piece cover and said arm shank, wherein the projecting wall section of said arm piece cover has, in a portion thereof adjacent to the distal end portion of said arm shank, positioning means and expansion/contraction permitting means located remoter than the positioning means from the abutment region, and wherein said expansion/contraction permitting means has an expansion/contraction margin for permitting thermal expansion/contraction of said arm piece cover in a longitudinal direction of said arm piece cover.

9. The wiper apparatus according to claim 8, wherein the side wall of the arm piece cover covers a front side surface, facing forward as viewed in a front-rear direction of the vehicle, of the arm piece.

10. The wiper apparatus according to claim 8, wherein the arm piece is formed of a material of greater rigidity than the arm piece cover.

* * * * *